Figure 1:
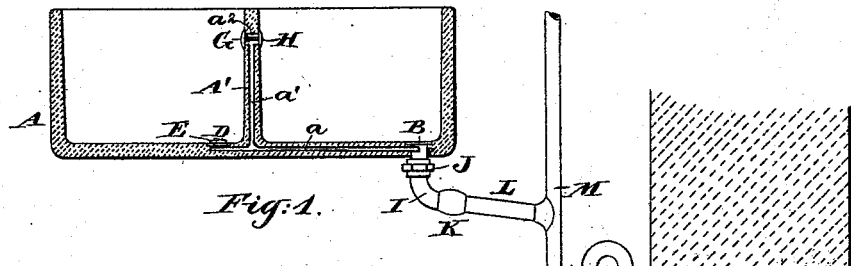

(No Model.) 2 Sheets—Sheet 1.

S. W. HENDRICKSON.
STATIONARY WASHTUB.

No. 543,480. Patented July 30, 1895.

Witnesses:
Charles R. Searle.
M. F. Boyle.

Inventor:
Sidney W. Hendrickson
by his attorney
Thomas Dyer Stetson (No Model.) 2 Sheets—Sheet 2.

S. W. HENDRICKSON.
STATIONARY WASHTUB.

No. 543,480. Patented July 30, 1895.

Witnesses:
Charles R. Searle.
M. F. Boyle.

Inventor:
Sidney W. Hendrickson
by his attorney
Thomas Drew Stetson

UNITED STATES PATENT OFFICE.

SIDNEY W. HENDRICKSON, OF NEW YORK, N. Y., ASSIGNOR TO WILLIAM HENDRICKSON, OF SAME PLACE.

STATIONARY WASHTUB.

SPECIFICATION forming part of Letters Patent No. 543,480, dated July 30, 1895.

Application filed July 12, 1894. Serial No. 517,275. (No model.)

*To all whom it may concern:*

Be it known that I, SIDNEY W. HENDRICKSON, of the city and county of New York, in the State of New York, have invented a certain new and useful Improvement in Stationary Washtubs, of which the following is a specification.

The invention applies to that class of stationary washtubs which are made in cement, and relates to the passages by which the water is discharged when desired. I make my tubs as usual—two together—separated by a fixed partition. As heretofore constructed, a difficulty has been encountered in making one discharge-aperture serve for both, in that when one compartment is being emptied and the other is empty or contains a less quantity of water the dirty water which is being discharged is liable to flow up through the connected passage into the other compartment. My invention avoids this difficulty and insures that either compartment may be emptied through a single discharge-passage provided with a diaphragm or partition without backing up into the other compartment. I facilitate the manufacture by a new method of construction of the passages. The discharge-orifice leads away from a point in the bottom near one end. The water is discharged from the compartment at that end directly. The discharge-orifice is surrounded by a bushing of metal, strongly anchored in the cement, soapstone, or slate, and having an aperture in one side to match the passage from the other tub to be presently described. A vertical partition is formed across the discharge-orifice arranged to allow the water from one compartment to flow down one side of such partition and the water from the other compartment to flow down through the other side of the said partition. The passage for the approach of the water from the other compartment of the tub is formed in the mid-thickness of the bottom. It leads from the bottom of the other compartment to the said aperture in the side of the final discharge-bushing. The passage for the overflow from both tubs is formed at the proper height in the vertical partition which separates the two compartments of the tub and communicates with the said horizontal passage in the bottom by means of a sufficient passage extending downward in the mid-thickness of the vertical partition. There should be a metal bushing for each of the apertures where the passages open into the interiors of the compartments of the tub. The bottom apertures are stopped with ordinary plugs. The overflow-apertures are covered with ordinary strainers.

In the manufacture of the tub I produce the required horizontal passage in the bottom by making, first, a suitable length of cement pipe, which may be of rectangular cross-section and having a depth a little less than that of the bottom. This piece, previously made and allowed to set with the required horizontal passage in it, is placed on the bench or in the bottom of the mold in which the tub is to be formed, and the cement which is to constitute the other parts of the tub is subsequently applied thereto, the proper metal bushings being introduced and held temporarily in the required position as the work proceeds. The result is a tub of practically uniform cement with the passages perfectly formed and accurately positioned.

The accompanying drawings form part of this specification and represent what I consider the best means of carrying out the invention.

Figure 2:
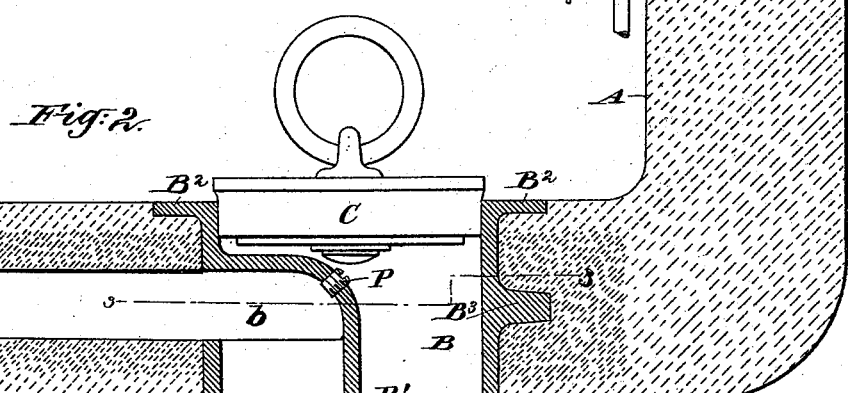
Figure 3:
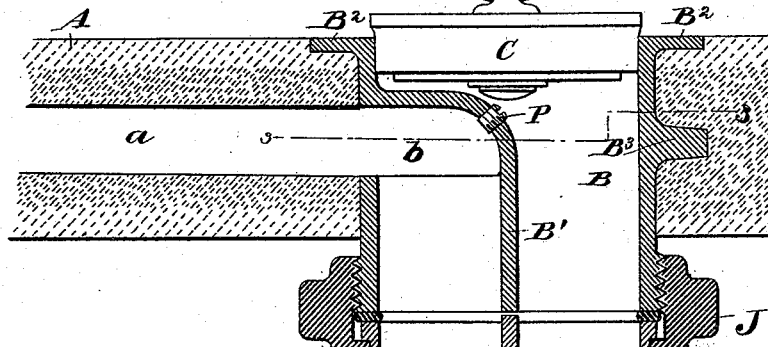
Figure 4:
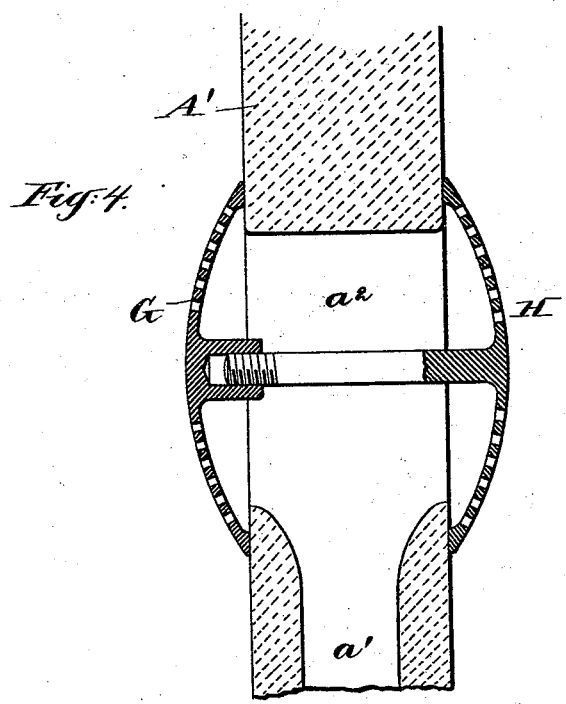
Figure 5:
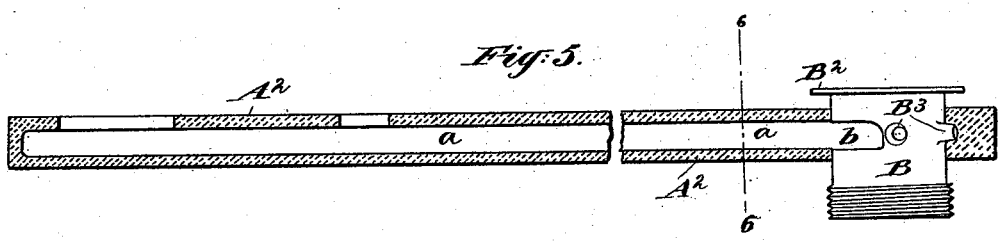
Figure 6:
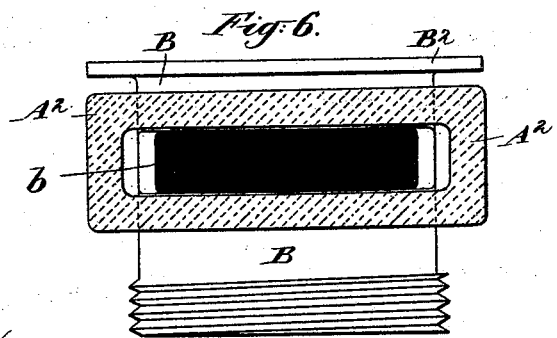

Figure 1 is a vertical section of the tub with an elevation of the connected pipes. Fig. 2 is a corresponding section of a portion on a larger scale. Fig. 3 is a horizontal section on the line 3 3 in Fig. 2. Fig. 4 is a vertical section of a portion. Fig. 5 is a side elevation of the discharge-bushing with a vertical longitudinal section through the portion of the bottom in which the horizontal passage is formed to conduct thereto the water which is discharged from the other compartment of the tub. This figure is on a scale intermediate between that in Figs. 1 and 2. Fig. 6 is a cross-section on the line 6 6 in Fig. 5. It is on the same scale as Fig. 2.

Similar letters of reference indicate corresponding parts in all the figures where they appear.

A is the main body of the tub, and A' a vertical partition formed integral therewith. These parts are all formed of a proper mixture of Portland cement and crushed granite.

B is a bushing of brass or other suitable non-corrosive material, strongly anchored in the required position for discharging the contents of one compartment of the tub. This bushing is formed with a lateral aperture $b$, and is provided with a dividing partition B' formed as shown in Fig. 2. The bushing presents a circular top, and receives a plug C of the ordinary form and material to control the discharge from that compartment of the tub, such discharge flowing down on one side of the central partition. The discharge from the other tub or the other compartment enters through the passage $b$ and flows down through the passage on the other side of the central partition in the bushing.

$B^2$ is a circular flange, which, when the tub is complete, lies flush with the inner face thereof.

$B^3$ $B^3$ are spurs formed on the exterior of the bushing at about the mid-thickness of the tub.

D is a shallower bushing which guards the passage in the bottom of the other compartment of the tub. This receives a plug E, which may be similar to the plug C.

G and H are convex strainers, guarding a discharge-orifice at the proper height in the central partition A'.

A horizontal passage $a$ leads from the bottom of the shallow bushing D to the aperture $b$ in the side of the bushing B. This carries the discharge-water from the proper compartment when it is required to empty it. A passage $a'$ extends up and down in the vertical partition A', connecting with the overflow aperture $a^2$ at the top and with the passage $a$ at the bottom. This constitutes the overflow passage. The water discharged from the proper compartment through the bushing D, and also any water overflowing from either compartment and descending through the passage $a'$, flows through the passage $a$ into the aperture $b$ in the bushing B, and thence downward on the proper side of the partition B'.

The water descending through either side of the partition in the bushing B escapes through the discharge-pipe I, which is curved as shown, and provided with a central partition I' coinciding in position with the partition B'. The water flowing down on either side of the partition B' remains on the corresponding side of the partition I'. This latter partition is continued so far that the water on being set free at the lower end is certain to flow away without risk of backing up into the other tub.

The pipe I is connected to the bushing B by a coupling or union J and packing of an ordinary construction. The lower end of the pipe I is connected by a wiped-joint K with a short slightly-inclined pipe L and a suitable wiped joint with a vertical waste-pipe M, which may lead from an adjacent sink, if preferred.

In order to most conveniently make the passage $a$ in the bottom of the tub and insure its proper connection to the orifice $b$ in the discharge-bushing B and avoid any difficulty in the manufacture, I produce this portion of the body of the tub in advance of the other parts and allow it to become set, and subsequently introduce this portion of the tub with the ends in the required positions, and the shallow bushing D, being set in its proper relation to the other parts, I apply the remainder of the cement to complete the tub. Figs. 5 and 6 show this part of the tub completed. It is a tube $A^2$ of rectangular cross-section. It embraces the bushing B, and is engaged strongly and reliably with that bushing by the aid of the spurs $B^3$. It may be produced in a suitable rectangular mold having the proper space for the bushing B, the interior of the tube being molded by a proper removable piece of wood or metal, and the proper holes being made in the top for the reception of the bushing D and for the connection to the upright overflow-passage $a'$. The extreme end at the right in this passage may be molded in an open condition and afterward stopped by a rectangular plug of the same, with the joint closed by cement. When this previously-formed pipe or rectangular tube of cement has had time to become completely set (it should by preference be made some hours or days in advance of the manufacture of the body of the tub) it is set in position and the material of the tub being applied around it, with ordinary provisions by a removable upright piece for molding the passage $a'$, the manufacture of the entire main body of the tub and of the partition up to the overflow-orifice may be proceeded with rapidly and without difficulty. The small portion of the partition above the overflow-orifice is applied in the obvious manner with a plug of wood or other suitable material introduced to keep open the overflow-passage.

P is a screw-plug set in the angular position shown closing a screw-threaded hole in the bushing B'. By removing the plug C and afterward removing this plug P an elastic wire (not shown) may be inserted to clear away greasy or other obstructions, inclining the end of the wire downward, allowing it to serve to clear the discharge-pipe I, and inclining the end of the wire upward or to the left in Figs. 1 and 2, causing it to enter and clear the passage $a$.

In applying the invention to tubs formed of hard material, as slate or soapstone, a passage serving in place of the passage $a$ may be produced in the material by boring, and the mouth of the hole at the extreme right in Figs. 1 and 2 may be afterward stopped with borings mixed with cement.

The passage $a$ is formed previous to the manufacture of the tub, because it is easy to thus produce it in great perfection, and it is almost or quite impracticable to produce such passage in the process of manufacturing the tub. I attach importance to the fact that the passage is thus formed in the same kind of material as the remainder of the tub, because of the greater adhesion of the material of the tub thereto, and also of the uniformity of condition of all the parts in relation to expansion and contraction. Metal is not equivalent.

Modifications may be made without departing from the principle or sacrificing the advantages of the invention. Instead of making the depth of the rectangular pipe $A^2$ only a portion of the thickness of the bottom of the tub, as indicated by the more numerous dotted section lines in Fig. 2, and completing the thickness of the bottom by adding further cement above and below at a later period when the main body of the tub is produced, I can make this previously-formed portion of a depth equal to the whole thickness of the bottom.

Parts of the invention can be used without the whole. I can employ the central partition B' in the bushing B without the corresponding central partition I' in the discharge-pipe I. This omission of the part I' may be effected successfully with the part B B' exactly as shown. It may be made more certainly successful by simply prolonging the part B downward a few inches farther than shown and correspondingly extending the central partition B' therein.

I claim as my invention—

1. The method described of producing tubs of cement with a passage in the bottom thereof, consisting in making a cement tube from a similar composition and allowing it to set, and in molding the material of the tub around the tube while in a plastic condition, and then drying the mass and causing it to unite with the cement of the tub into a homogeneous mass, substantially as herein specified.

2. In a wash-tub having two compartments, a single discharge orifice having set therein the casting B having the central partition B', flange $B^2$ and a series of spurs $B^3$ at or near the mid-thickness of the cement, with the spaces on opposite sides of the central partition B', in connection with the two compartments of the tub, all arranged to serve substantially as herein specified.

3. In a wash-tub having two compartments, a discharge passage $a$ leading from one compartment, in combination with a single casting B having a partition B', the spaces on the opposite sides of which communicate respectively with the two compartments of the tub and also with a discharge pipe I leading from such casting the latter provided with a coinciding partition I', extending downward therein, so as to form a continuation of the division between the outlet passages from the two compartments, all arranged for joint operation substantially as herein specified.

In testimony that I claim the invention above set forth I affix my signature in presence of two witnesses.

SIDNEY W. HENDRICKSON.

Witnesses:
CHARLES R. SEARLE,
M. F. BOYLE.